(12) United States Patent
Lin et al.

(10) Patent No.: US 8,053,670 B2
(45) Date of Patent: Nov. 8, 2011

(54) APPARATUS FOR AN ELECTRICAL EQUIPMENT ENCLOSURE WITH TUBULAR WEATHERPROOFING OF ELECTRICAL CONNECTIONS

(75) Inventors: David D. Lin, Milpitas, CA (US); Chih Chiang, Fremont, CA (US)

(73) Assignee: Inscape Data Corporation, San Jose, CA (US)

( * ) Notice: Subject to any disclaimer, the term of this patent is extended or adjusted under 35 U.S.C. 154(b) by 200 days.

(21) Appl. No.: 12/490,312

(22) Filed: Jun. 23, 2009

(65) Prior Publication Data

US 2010/0319952 A1    Dec. 23, 2010

(51) Int. Cl.
*H01R 13/46* (2006.01)
(52) U.S. Cl. ............... 174/59; 174/50; 174/60; 174/64; 385/140
(58) Field of Classification Search .............. 174/24, 174/34, 50, 50.52, 60, 64, 59; 385/140; 439/207, 439/216
See application file for complete search history.

(56) References Cited

U.S. PATENT DOCUMENTS

| | | | |
|---|---|---|---|
| 6,184,467 B1 * | 2/2001 | Milanowski et al. | 174/655 |
| 6,804,448 B2 * | 10/2004 | Chang | 385/140 |
| 7,759,575 B2 * | 7/2010 | Jones et al. | 174/50 |

* cited by examiner

*Primary Examiner* — Dhirubhai R Patel
(74) *Attorney, Agent, or Firm* — Invent Capture, LLC; Samuel S. Cho

(57) ABSTRACT

An apparatus for an electrical equipment enclosure with tubular weatherproofing of electrical connections is disclosed. In one embodiment of the invention, one or more weatherproofing tubes attached to the lid incorporating one or more conduits are configured to serve as passageways for one or more electrical lines which need to stay weatherproof, watertight, and/or splash-proof from external elements. Furthermore, in one embodiment of the invention, one or more clusters of electrical connectors inside the electrical equipment enclosure receive a portion of the one or more electrical lines passing through the one or more conduits and the one or more weatherproofing tubes. The apparatus as embodied by the present invention provides a reliable, durable and cost-effective weatherproof electrical equipment enclosure design.

13 Claims, 5 Drawing Sheets

US 8,053,670 B2

APPARATUS FOR AN ELECTRICAL EQUIPMENT ENCLOSURE WITH TUBULAR WEATHERPROOFING OF ELECTRICAL CONNECTIONS

BACKGROUND

Today's data network and other telecommunications applications increasingly focus on providing a ubiquitous availability of their services in both indoor and outdoor environments. Examples of such data network and telecommunication applications providing ubiquitous availability include, but are not limited to, IEEE 802.11-related wireless local area network (WLAN), IEEE 802.16-related wireless wide area network (wireless WAN, also known as WiMAX), radio-frequency identification (RFID) applications, and cellular communication applications. As a result, many data network and telecommunication equipment which were typically installed indoors are now increasingly required to be installed in outdoor environments.

Installing network and telecommunication equipment outdoors bring significant reliability and safety challenges to a network and/or telecommunication equipment manufacturer. Because an outdoor electrical equipment (i.e. including a network and/or telecommunication equipment) installed in an outdoor environment is typically not placed in a temperature-controlled and/or a waterproof building, the outdoor electrical equipment is expected to withstand wind, external debris (e.g. dusts, insects, and etc), and dramatically varying seasonal temperatures and humidity for its expected operating life.

A conventional way of designing an outdoor electrical equipment involves a weatherproof enclosure containing all or most electronic, networking, and/or telecommunication components inside. The weatherproof enclosure is typically designed with specialized watertight or splash-proof electrical connectors for data and/or power cable connections. The specialized watertight or splash-proof electrical connectors are designed to keep external elements and water out of the electronic, networking, and/or telecommunication components.

A significant drawback to the conventional weatherproof enclosure design is a high cost of manufacturing and assembly of the specialized watertight or splash-proof electrical connectors. For example, conventional electrical input and output connectors on an exterior surface of a weatherproof enclosure are specialized watertight or splash-proof electrical connectors with rubberized watertight jacks. These specialized watertight or splash-proof electrical connectors add significant part and assembly costs to an outdoor electrical equipment. Furthermore, the specialized watertight or splash-proof electrical connectors bring design constraints and complexity to an outdoor electrical equipment because they take up a larger space than indoor jacks and typically require a careful alignment planning and even a specialized printed circuit board (PCB's).

Therefore, it is advantageous to devise a novel method and an apparatus that can reduce design constraints and manufacturing costs of a weatherproof enclosure containing electrical equipment.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, an apparatus for an electrical equipment enclosure with tubular weatherproofing of electrical connections is disclosed. The apparatus comprises a lid for the electrical equipment enclosure, wherein the lid has one or more conduits configured to allow one or more electrical lines pass through; one or more weatherproofing tubes operatively attached to the lid using a corresponding number of tube holders, wherein the one or more weatherproofing tubes are configured to become passageways for the one or more electrical lines which need to stay weatherproof, watertight, and/or splash-proof from external elements; and one or more clusters of electrical connectors inside the electrical equipment enclosure, wherein each cluster receives a portion of the one or more electrical lines which passed through a single conduit among the one or more conduits and a corresponding single weatherproofing tube among the one or more weatherproofing tubes.

Furthermore, in one embodiment of the invention, an apparatus for an outdoor network equipment enclosure with tubular weatherproofing of electrical connections is also disclosed. This apparatus comprises a lid for the outdoor network equipment enclosure, wherein the lid forms a weatherproof, watertight, and/or splash-proof condition with a front portion of the outdoor network equipment enclosure and wherein the lid has one or more conduits configured to allow one or more electrical lines pass through; one or more weatherproofing tubes operatively attached to the lid using a corresponding number of tube holders, wherein the one or more weatherproofing tubes are configured to become passageways for the one or more electrical lines which need to stay weatherproof, watertight, and/or splash-proof from external elements; and one or more clusters of electrical connectors inside the outdoor network equipment enclosure, wherein each cluster receives a portion of the one or more electrical lines which passed through a single conduit and a corresponding single weatherproofing tube.

DETAILED DESCRIPTION

Figure 1:
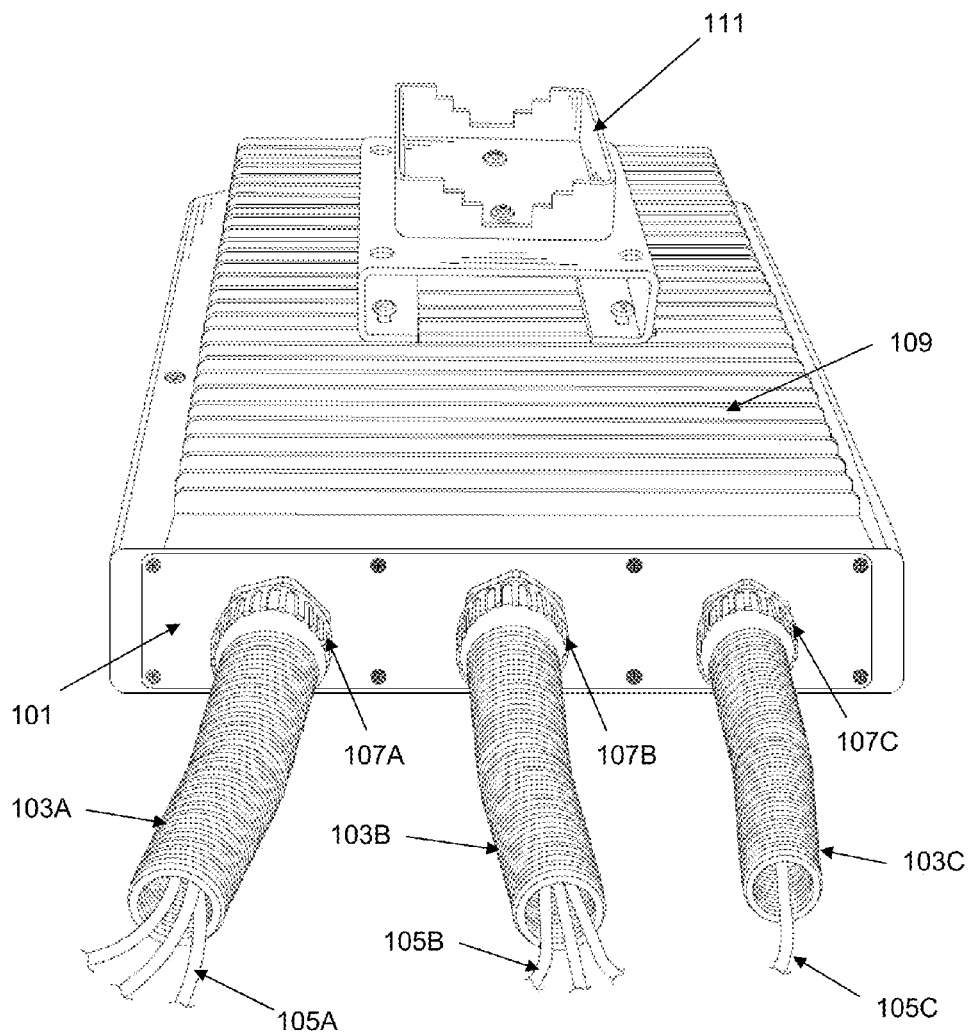
FIG. 1 shows a frontal view of an apparatus for an electrical equipment enclosure with tubular weatherproofing of electrical connections and a frontal view of a closed-lid in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of figures, procedures, logic blocks, processing, and/or other symbolic representations that directly or indirectly resemble an apparatus and/or a method for weatherproof electrical connection of outdoor electrical equipment. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order and do not imply any limitations in the invention.

In general, embodiments of the invention relate to an enclosure to electrical components. More specifically, an embodiment of the invention relates to a weatherproof enclosure containing one or more electrical components which require power and/or data connections into the weatherproof enclosure. Examples of electrical components contained inside the weatherproof enclosure include, but are not limited to, at least some portion of IEEE 802.11-related wireless local area network (WLAN) components, IEEE 802.16-related wireless wide area network (wireless WAN, also known as WiMAX) components, radio-frequency identification (RFID) components, and/or cellular communication components.

Furthermore, an embodiment of the invention relates to an apparatus for an electrical equipment enclosure with tubular weatherproofing of electrical connections. Electrical connections may involve, but are not limited to, power and data line connections.

In addition, an embodiment of the invention relates to a lid with one or more conduits configured fit tubular weatherproofing materials in front of the lid, wherein both the one or more conduits and the tubular weatherproofing materials are designed to encircle one or more electrical lines operatively connected to one or more electrical jacks inside an electrical equipment enclosure.

Yet another embodiment of the invention relates to a method for providing a watertight tubular passageway and a watertight conduit for one or more electrical lines operatively connected to one or more electrical jacks inside an electrical equipment enclosure.

Furthermore, one objective of the invention is to provide a cost-effective and weatherproof electrical equipment enclosure with less design and space constraints than a conventional weatherproof electrical equipment enclosure. A further objective of the invention is to achieve an ease of manufacturing and assembly of a weatherproof electrical equipment enclosure by enabling the use of cheaper standard jacks inside the weatherproof electrical equipment enclosure instead of requiring a use of specialized electrical connectors with rubberized watertight jacks.

Yet another objective of the invention is to provide a method for a watertight, weatherproof, or splash-proof connection of an electrical cord (e.g. a power cord or a data cord) at one end of an electrical line (e.g. a power line or a data line) to an electrical jack inside an electrical equipment enclosure in accordance with the invention.

For the purpose of describing the invention, a term "weatherproof" is defined as exhibiting at least some degree of impermeability against external elements, including water, dusts, insects, and/or other debris.

For the purpose of describing the invention, a term "watertight" is defined as exhibiting at least some degree of impermeability against water even when a "watertight" device is completely soaked or submerged under water.

For the purpose of the describing the invention, a term "splash-proof" is defined as exhibiting at least some degree of protection against water when a "splash-proof" device is splashed with water.

Furthermore, for the purpose of describing the invention, a term "tubular weatherproofing" is defined as encircling one or more electrical lines with a protective tubular material such as a plastic tube, a rubber tube, or any synthetic tube, wherein the protective tubular materials provide at least some degree of impermeability against undesirable external elements such as water, dusts, insects, and/or other debris in order to keep the one or more electrical lines weatherproof until they are connected to one or more electrical jacks inside an electrical equipment enclosure.

FIG. 1 shows a frontal view of an apparatus (100) for an electrical equipment enclosure (109) with tubular weatherproofing of electrical connections and a frontal view of a closed-lid (101) in accordance with an embodiment of the invention. The electrical equipment enclosure (109), in one embodiment of the invention, may also have an equipment docking material (111). In a preferred embodiment of the invention, a lid (101) for the electrical equipment enclosure (109) has one or more conduits connected to a corresponding number of weatherproofing tubes (i.e. 103A, 103B, and 103C). Furthermore, in the preferred embodiment of the invention, the one or more conduits on the lid (101) and the corresponding number of weatherproofing tubes (i.e. 103A, 103B, and 103C) are tightly held together by a corresponding number of tube holders (i.e. 107A, 107B, and 107C). It is desirable to design the tube holders (107A, 107B, and 107C) to be weatherproof, watertight, or splash-proof so that external elements such as water, dusts, and/or insects will be kept out of a connecting portion between the lid (101) and the weatherproofing tubes (103A, 103B, and 103C).

In a preferred embodiment of the invention, a flexible plastic material such as a polyvinyl chloride (PVC)-based material is used to form a weatherproofing tube (e.g. 103A, 103B, or 103C). In another embodiment of the invention, a rubber-based material can be used to form a weatherproofing tube (e.g. 103A, 103B, or 103C). Yet in another embodiment of the invention, weatherproof fabrics, carbon fibers, or other materials may be used to constitute a weatherproofing tube.

In a preferred embodiment of the invention, a plurality of electrical lines (105A or 105B) are encircled by a weatherproofing tube (103A or 103B). Even though each electrical line may be encapsulated by its own protective and insulation materials such as PVC, rubber, or weaved fabric, such individual electrical line encapsulations are not designed to withstand harsh outdoor environments which involve dramatic temperature changes and erosive elements such as dusts, insect, wind, humidity, and moisture (e.g. water). Therefore, a significant degree of impermeability against erosive elements and protection offered by a weatherproofing tube (e.g. 103A) encircling a plurality of electrical lines (e.g. 105A) provide added ruggedness and durability. Furthermore, the use of a weatherproofing tube (e.g. 103A) for encircling a plurality of electrical lines (e.g. 105A) enable the use of standard jacks, plugs, and/or connectors instead of specialized weatherproof rubber jacks, plugs, and/or connectors inside the electrical equipment enclosure (109), which is a significant cost and design advantage over conventional outdoor electrical equipment enclosures.

Continuing with FIG. 1, a single electrical line (105C) can also be encircled by a dedicated weatherproofing tube (103C) in one embodiment of the invention. In a preferred embodiment of the invention, the single electrical line (105C) may be a power line with an electrical cord at one end of the power line to be connected to a power plug inside an electrical equipment enclosure (109). In another embodiment of the invention, the single electrical line (105C) may simply be a data line with a standard jack operatively connected to a standard plug inside the electrical equipment enclosure (109).

It is generally desirable to keep the electrical equipment enclosure (109) to be weatherproof, watertight, or splashproof in order to maximize advantages provided by weatherproofing tubes (103A, 103B, and 103C) for external electrical connections (e.g. 105A, 105B, 105C) to the electrical equipment enclosure (109). An embodiment of the invention as shown by FIG. 1 may exhibit significant cost advantages over conventional weatherproofing outdoor enclosures for electrical equipment, because inexpensive plastic or rubber weatherproofing tubes (e.g. 103A, 103B, 103C) can provide weatherproofing to all external electrical connections to the electrical equipment enclosure (109) without requiring any costly and typical modifications such as adding rubberized weatherproofing elements to jacks for outdoor weatherproofing.

Figure 2:
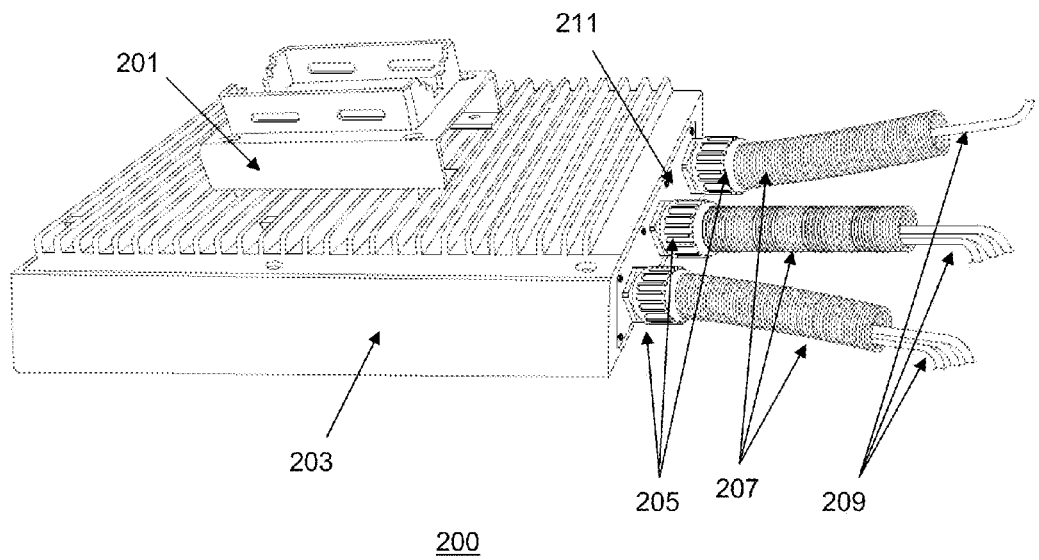
FIG. 2 shows a side view of an apparatus for an electrical equipment enclosure with tubular weatherproofing of electrical connections and a side view of a closed lid in accordance with an embodiment of the invention.

FIG. 2 shows a side view of an apparatus (200) for an electrical equipment enclosure (203) with tubular weatherproofing of electrical connections and a side view of a closed lid (211) in accordance with an embodiment of the invention. The electrical equipment enclosure (203), in one embodiment of the invention, may also have an equipment docking material (201). In a preferred embodiment of the invention, a closed lid (211) for the electrical equipment enclosure (203) has one or more conduits connected to a corresponding number of weatherproofing tubes (207).

Furthermore, in the preferred embodiment of the invention, the one or more conduits on the closed lid (211) and the corresponding number of weatherproofing tubes (207) are tightly held together by a corresponding number of tube holders (205). It is desirable to design the tube holders (205) to be weatherproof, watertight, or splash-proof so that external elements such as water, dusts, and/or insects will be kept out of a connecting portion between the closed lid (211) and the weatherproofing tubes (207). As shown in FIG. 2, in one embodiment of the invention, a plurality of external electrical lines (209) (e.g. data line connections and/or power line connections) is protected by three encircling weatherproofing tubes (207) and go through three conduits on the closed lid (211) which is held together tightly with the three encircling weatherproofing tubes (207) by three tube holders (205).

Figure 3:
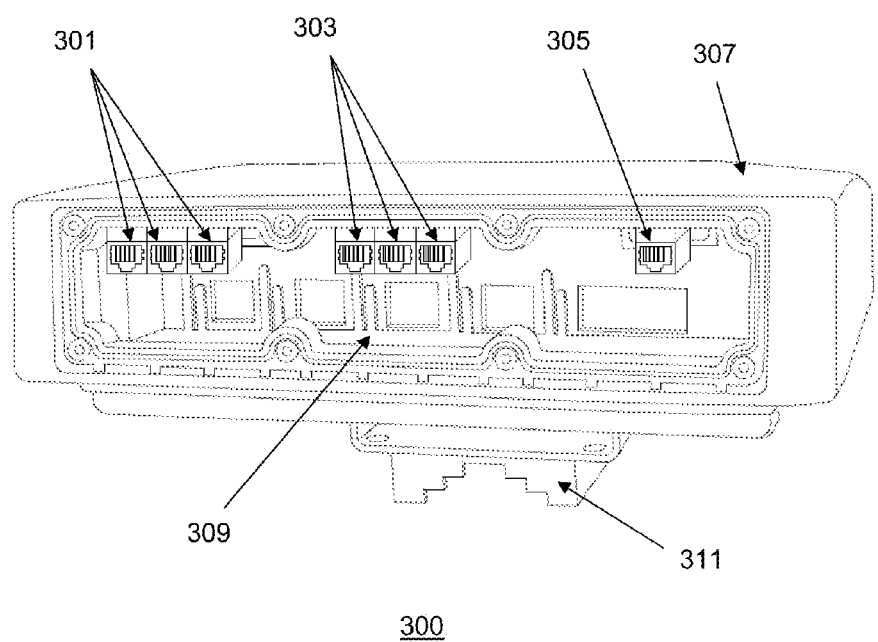
FIG. 3 shows an open-lid frontal view of an apparatus for an electrical equipment enclosure with tubular weatherproofing of electrical connections in accordance with an embodiment of the invention.

FIG. 3 shows an open-lid frontal view of an apparatus (300) for an electrical equipment enclosure (307) with tubular weatherproofing of electrical connections in accordance with an embodiment of the invention. The electrical equipment enclosure (307), in one embodiment of the invention, may also have an equipment docking material (311). In a preferred embodiment of the invention, a first group of electrical connectors (301) is located on a front-left side of the electrical equipment enclosure (307). The first group of electrical connectors (301) is configured to dock with electrical jacks from external electrical lines that reached the first group of electrical connectors (301) by going through a first weatherproofing tube and a first conduit of a lid.

Similarly, a second group of electrical connectors (303) is located on a middle portion of the electrical equipment enclosure (307). The second group of electrical connectors (303) is configured to dock with electrical jacks from external electrical lines that reached the second group of electrical connectors (303) by going through a second weatherproofing tube and a second conduit of the lid.

Likewise, a single electrical connector (305) is located on a front-right portion of the electrical equipment enclosure (307). The single electrical connector (305) is configured to dock with an electrical jack from an external electrical line that reached the single electrical connector (305) by going through a third weatherproofing tube and a third conduit of the lid.

Figure 4:
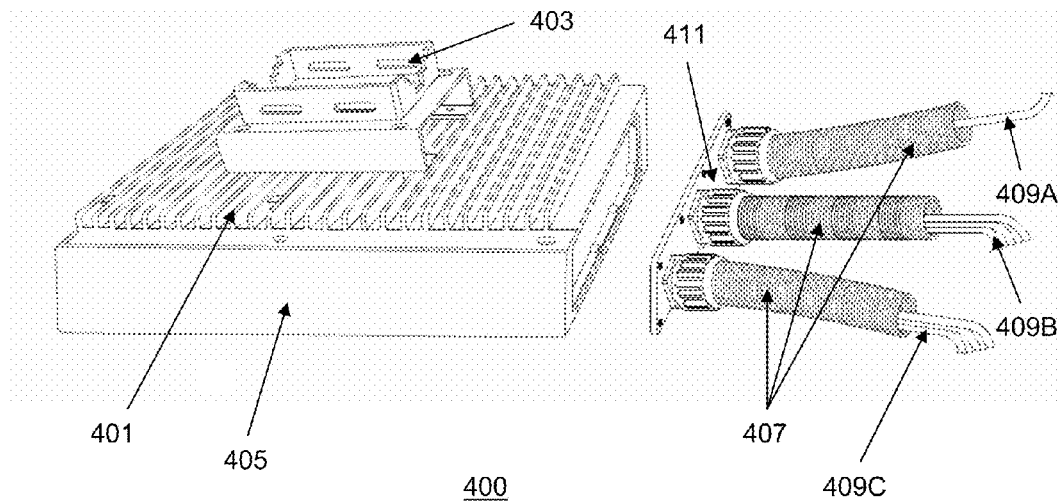
FIG. 4 shows a side view of an apparatus for an electrical equipment enclosure with tubular weatherproofing of electrical connections and a side view of an open lid in accordance with an embodiment of the invention.

FIG. 4 shows a side view of an apparatus (400) for an electrical equipment enclosure (405) with tubular weatherproofing of electrical connections and a side view of an open lid (411) in accordance with an embodiment of the invention. In one embodiment of the invention, an equipment docking material (403) designed to attach the electrical equipment enclosure (405) to a fixed position relative to a pole or any other desired object is present at one surface (401) of the electrical equipment enclosure (405).

As shown in FIG. 4, in a preferred embodiment of the invention, an open lid (411) comprises a plurality of conduits, a plurality of corresponding weatherproofing tubes (407) to the plurality of conduits, a plurality of tube holders configured to hold the plurality of corresponding weatherproofing tubes (407) together with the open lid (411), and a plurality of electrical lines (409A, 409B, 409C) going through the plurality of conduits and the plurality of corresponding weatherproofing tubes (407).

Continuing with FIG. 4, in one embodiment of the invention, the open lid (411) can be attached to the electrical equipment enclosure (405) to become a "closed lid" by one or more screws. In another embodiment of the invention, the open lid (411) can be attached to the electrical equipment enclosure (405) to become a "closed lid" by using a closing latch. Yet in another embodiment of the invention, the open lid (411) is already attached to the electrical equipment enclosure with a hinge, which allows the open lid (411) to swing around the hinge to become a closed lid.

Figure 5:
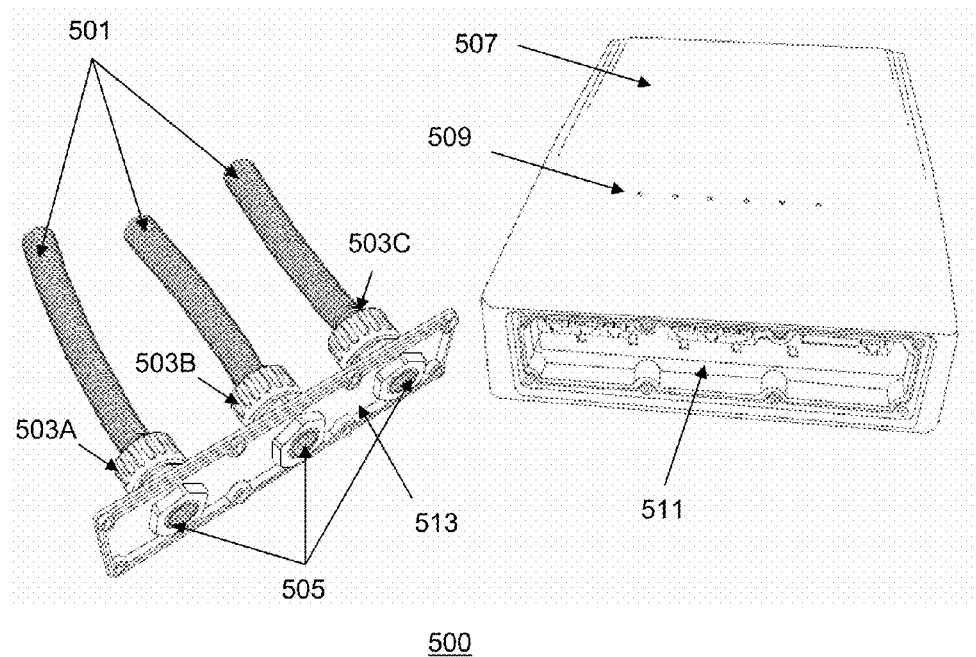
FIG. 5 shows an open-lid frontal view of an apparatus for an electrical equipment enclosure with tubular weatherproofing of electrical connections and a rear view of a lid in accordance with an embodiment of the invention.

FIG. 5 shows an open-lid frontal view of an apparatus (500) for an electrical equipment enclosure with tubular weatherproofing of electrical connections and a rear view of a lid (513) in accordance with an embodiment of the invention. In one embodiment of the invention, the lid (513) comprises a plurality of conduits (505), which are passages and channels on a surface of the lid (503) to allow electrical lines (e.g. 627, 629, 631 of FIG. 6) to go through the lid (503) to reach electrical connectors (e.g. 611, 613, 615 of FIG. 6) inside the electrical equipment enclosure (511). Furthermore, a plurality of corresponding weatherproofing tubes (501) is operatively connected to the plurality of conduits (505), and a plurality of tube holders (503A, 503B, 503C) is configured to hold the plurality of corresponding weatherproofing tubes (501) together with the lid (503). In addition, as shown in FIG. 5, the lid (513) may also utilize additional tube-holding elements on a rear surface (i.e. on the opposite surface of the plurality of tube holders (503A, 503B, 503C)) of the lid (513).

In a preferred embodiment of the invention, the additional tube-holding elements fixed on a rear surface of the lid (513) can function as "screws" sticking out to a front surface of the lid (513), which allow the plurality of tube holders (503A, 503B, 503C) to rotate through the "screws" (i.e. protrusive portions of the additional tube-holding elements on the front surface of the lid (513)) to tightly-fixed positions. In one embodiment of the invention, the plurality of weatherproofing tubes (501) is glued or pre-attached to the additional tube-holding elements, which are then secured into fixed positions with the plurality of tube holders (e.g. 503A, 503B, 503C). In another embodiment of the invention, the plurality of weatherproofing tubes (501) is pre-attached to the plurality of tube holders (503A, 503B, 503C), and the pre-attached pieces rotate through the "screws" of the additional tube-holding elements to fixed positions.

Figure 6:
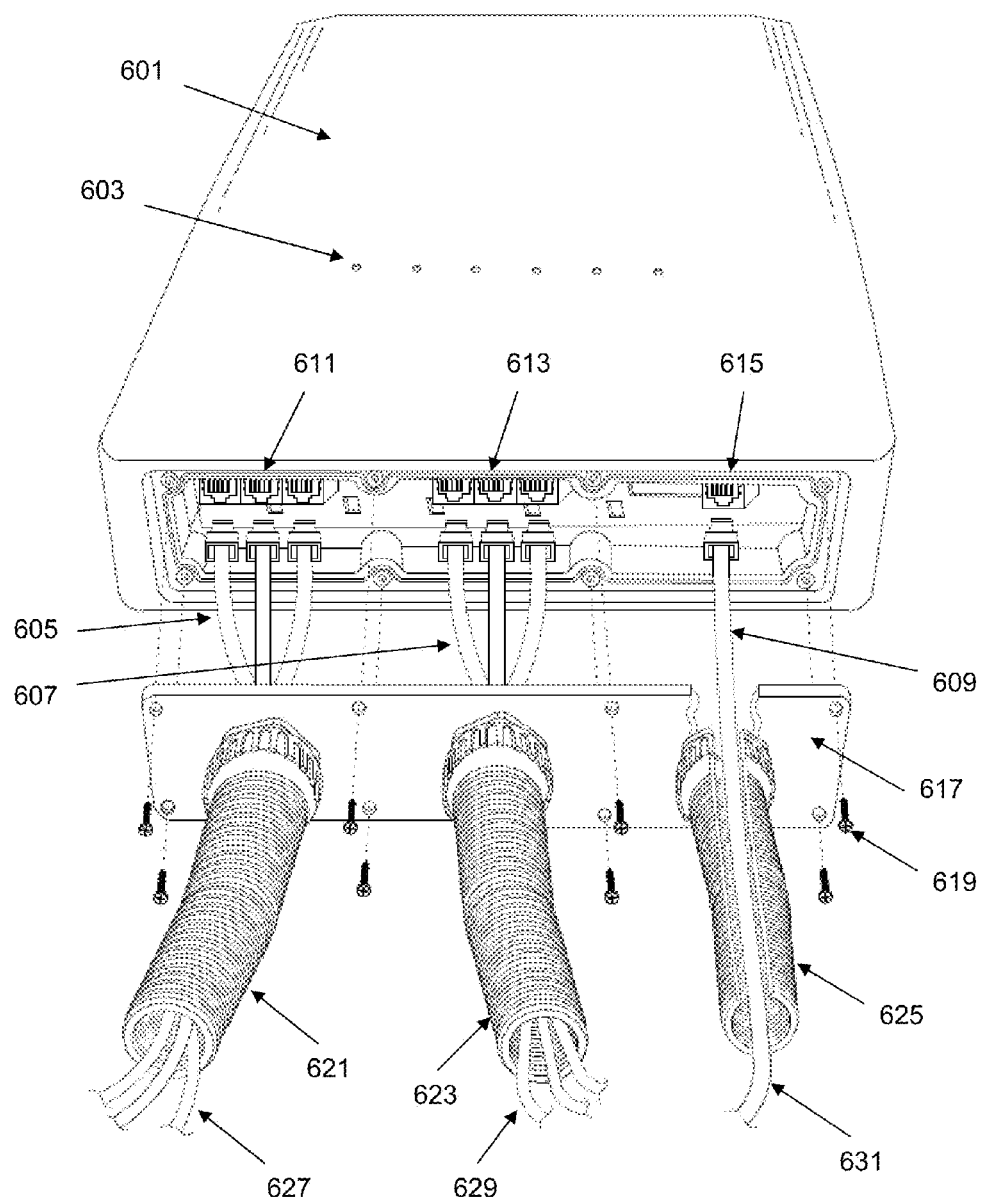
FIG. 6 shows an exploded frontal view of an apparatus for an electrical equipment enclosure with tubular weatherproofing of electrical connections in accordance with an embodiment of the invention.

FIG. 6 shows an exploded frontal view of an apparatus (600) for an electrical equipment enclosure (601) with tubular weatherproofing of electrical connections in accordance with an embodiment of the invention. The electrical equipment enclosure (601) may have indicator lights (603) for displaying the current functionality of the electrical equipment inside. In one embodiment of the invention, a lid (617) for the electrical equipment enclosure (601) has one or more conduits connected to a corresponding number of weatherproofing tubes (i.e. 621, 623, 625). As shown in FIG. 6, the one or more conduits on the lid (617) and the corresponding weatherproofing tubes (i.e. 621, 623, 625) are tightly held together by tube holders. It is desirable to design the tube holders to be weatherproof, watertight, or splash-proof so that external elements such as water, dusts, and/or insects will be kept out of a connecting portion between the lid (617) and the weatherproofing tubes (621, 623, 625).

In a preferred embodiment of the invention, a flexible plastic material such as a polyvinyl chloride (PVC)-based material is used to form a weatherproofing tube (e.g. 621, 623, or 625). In another embodiment of the invention, a rubber-based material can be used to form a weatherproofing tube (e.g. 621, 623, or 625). Yet in another embodiment of the invention, weatherproof fabrics, carbon fibers, or other materials may be used to constitute a weatherproofing tube.

In a preferred embodiment of the invention, a plurality of electrical lines (e.g. 627 or 629) is encircled by a weatherproofing tube (e.g. 621 or 623). Even though each electrical line may be encapsulated by its own protective and insulation materials such as PVC, rubber, or weaved fabric, such individual electrical line encapsulations are not designed to withstand harsh outdoor environments which involve dramatic temperature changes and erosive elements such as dusts, insect, wind, humidity, and moisture (e.g. water). Therefore, a significant degree of impermeability against erosive elements and protection offered by a weatherproofing tube (e.g. 621) encircling a plurality of electrical lines (e.g. 627) provides added ruggedness and durability. Furthermore, the use of a weatherproofing tube (e.g. 621) for encircling a plurality of electrical lines (e.g. 627) enable the use of standard jacks, plugs, and/or connectors instead of specialized weatherproof rubber jacks, plugs, and/or connectors inside the electrical equipment enclosure (601), which is a significant cost and design advantage over conventional outdoor electrical equipment enclosures.

Continuing with FIG. 6, a single electrical line (631) can also be encircled by a weatherproofing tube (625) in one embodiment of the invention. For illustrative purposes, an internal structure of a weatherproofing tube (625) is displayed in FIG. 6. In a preferred embodiment of the invention, the single electrical line (631) may be a power line with an electrical cord at one end of the power line to be connected to a power plug inside an electrical equipment enclosure (601). In another embodiment of the invention, the single electrical line (631) may simply be a data line (609) with a standard jack operatively connected to a standard data connector (615) inside the electrical equipment enclosure (601).

In a preferred embodiment of the invention, a first group of electrical connectors (611) is located on a front-left side of the electrical equipment enclosure (601). The first group of electrical connectors (611) is configured to dock with electrical jacks from external electrical lines that reached (i.e. 605) the first group of electrical connectors (611) by going through a first weatherproofing tube (621) and a first conduit of a lid (617). In the preferred embodiment of the invention as shown in FIG. 6, each "electrical line" (e.g. one of the three insulated cables shown in 627, an insulated cable shown in 631, and etc.) embeds multiple individual electrical wires and multiple electrical contacts, but still forms a single electrical jack, which is plugged into (i.e. 609) an electrical connector (615), as shown by elements 631, 609, and 615 in FIG. 6, for example. This electrical jack connection does not require individual electrical wires to be individually connected to the electrical connector, wire-by-wire.

Similarly, a second group of electrical connectors (613) is located on a middle portion of the electrical equipment enclosure (601). The second group of electrical connectors (613) is configured to dock with electrical jacks from external electrical lines that reached (i.e. 607) the second group of electrical connectors (613)) by going through a second weatherproofing tube (623) and a second conduit of the lid (617).

Likewise, a single electrical connector (615) is located on a front-right portion of the electrical equipment enclosure (601). The single electrical connector (615) is configured to dock with an electrical jack from an external electrical line that reached (i.e. 609) the single electrical connector (615) by going through a third weatherproofing tube (625) and a third conduit of the lid (617).

Continuing with FIG. 6, in one embodiment of the invention, the lid (617) can be attached to the electrical equipment enclosure (601) to become a "closed lid" by one or more screws (619). In another embodiment of the invention, the lid (617) can be attached to the electrical equipment enclosure (601) to become a "closed lid" by using a closing latch. Yet in another embodiment of the invention, the lid (617) is already attached to the electrical equipment enclosure with a hinge, which allows the lid (617) to swing around the hinge to become a closed lid.

Figure 7:
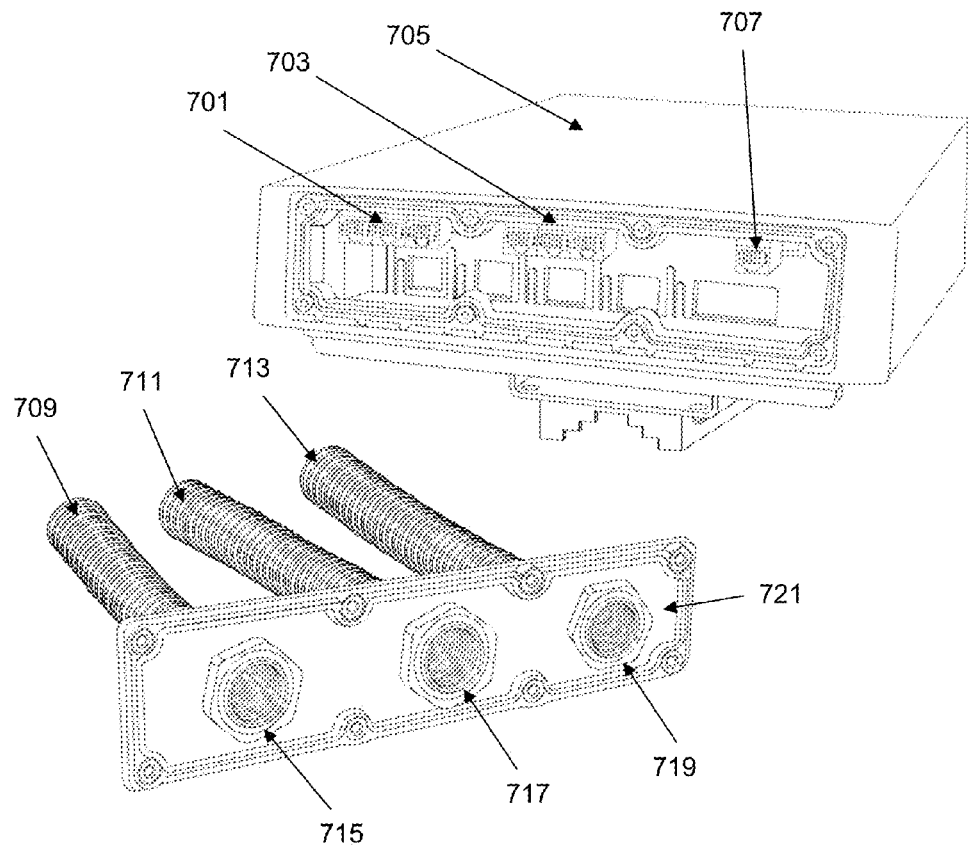
FIG. 7 shows an open-lid frontal view of an apparatus for an electrical equipment enclosure with tubular weatherproof-

FIG. 7 shows an open-lid frontal view of an apparatus (700) for an electrical equipment enclosure (705) with tubular weatherproofing of electrical connections and a rear view of a lid (721) in accordance with an embodiment of the invention. In one embodiment of the invention, the lid (721) comprises a plurality of conduits (715, 717, 719), a plurality of corresponding weatherproofing tubes (709, 711, 713) to the plurality of conduits (715, 717, 719), and a plurality of tube holders configured to hold the plurality of corresponding weatherproofing tubes (709, 711, 713) together with the lid (721).

In one embodiment of the invention, a first group of electrical connectors (701) is located on a front-left side of the electrical equipment enclosure (705). The first group of electrical connectors (701) is configured to dock with electrical jacks from external electrical lines that reached the first group of electrical connectors (701) by going through a first weatherproofing tube (i.e. 713) and a first conduit (i.e. 710) of a lid (721).

Similarly, a second group of electrical connectors (703) is located on a middle portion of the electrical equipment enclosure (705). The second group of electrical connectors (703) is configured to dock with electrical jacks from external electrical lines that reached the second group of electrical connectors (703) by going through a second weatherproofing tube (711) and a second conduit (717) of the lid (721).

Likewise, a single electrical connector (707) is located on a front-right portion of the electrical equipment enclosure (705). The single electrical connector (707) is configured to dock with an electrical jack from an external electrical line that reached the single electrical connector (707) by going through a third weatherproofing tube (709) and a third conduit (715) of the lid (721).

The use of weatherproofing tubes and conduits on a lid of the electrical equipment enclosure as embodied by the present invention results in a cost-effective weatherproof electrical equipment enclosure with less design and space constraints than conventional weatherproof enclosure designs. Another advantage of the present invention comes from the use of cheaper standard jacks inside the weatherproof electrical equipment enclosure instead of specialized electrical connectors with rubberized watertight jacks. The specialized electrical connectors with weatherproof and/or rubberized watertight jacks are not needed in the present invention because electrical connections into a weatherproof electrical equipment enclosure of the present invention are protected from external elements and water by weatherproofing tubes and corresponding conduits on the lid. The present invention therefore provides a reliable, durable, and cost-effective weatherproof design for an electrical equipment enclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for an electrical equipment enclosure with tubular weatherproofing of electrical connections, the apparatus comprising:
a lid for the electrical equipment enclosure, wherein the lid has one or more conduits configured to allow one or more electrical lines pass through;
one or more weatherproofing tubes operatively attached to the lid using a corresponding number of tube holders, wherein the one or more weatherproofing tubes are configured to become passageways for the one or more electrical lines which need to stay weatherproof, watertight, and/or splash-proof from external elements; and
one or more clusters of electrical connectors inside the electrical equipment enclosure, wherein each cluster receives a portion of the one or more electrical lines which passed through one of the one or more conduits and a corresponding one of the one or more weatherproofing tubes, and wherein each electrical line embeds multiple individual electrical wires and multiple electrical contacts to form a single electrical jack plugged into one of the electrical connectors.

2. The apparatus for the electrical equipment enclosure of claim 1, wherein the one or more weatherproofing tubes encircle the one or more electrical lines which have individual electrical insulations.

3. The apparatus for the electrical equipment enclosure of claim 1, wherein the one or more weatherproofing tubes are made of malleable plastics, fabrics, or any material that provide some degree of impermeability against external elements.

4. The apparatus for the electrical equipment enclosure of claim 1, wherein the one or more weatherproofing tubes are made of polyvinyl chloride (PVC)-based material.

5. The apparatus for the electrical equipment enclosure of claim 1, wherein the lid forms a weatherproof, watertight, and/or splash-proof condition for a front portion of the electrical equipment enclosure.

6. The apparatus for the electrical equipment enclosure of claim 1, further comprising a plurality of screws to enable the lid form the weatherproof, watertight, and/or splash-proof condition for the front portion of the electrical equipment enclosure.

7. The apparatus for the electrical equipment enclosure of claim 1, wherein the one or more clusters of electrical connectors provide electrical connections for power and/or data lines coming into the electrical equipment enclosure.

8. An apparatus for an outdoor network equipment enclosure with tubular weatherproofing of electrical connections, the apparatus comprising:
a lid for the outdoor network equipment enclosure, wherein the lid forms a weatherproof, watertight, and/or splash-proof condition with a front portion of the outdoor network equipment enclosure and wherein the lid has one or more conduits configured to allow one or more electrical lines pass through;
one or more weatherproofing tubes operatively attached to the lid using a corresponding number of tube holders, wherein the one or more weatherproofing tubes are configured to become passageways for the one or more electrical lines which need to stay weatherproof, watertight, and/or splash-proof from external elements; and
one or more clusters of electrical connectors inside the outdoor network equipment enclosure, wherein each cluster receives a portion of the one or more electrical lines which passed through one of the one or more conduits and a corresponding one of the one or more weatherproofing tubes, and wherein each electrical line embeds multiple individual electrical wires and multiple electrical contacts to form a single electrical jack plugged into one of the electrical connectors.

9. The apparatus for the outdoor network equipment enclosure of claim 8, wherein the one or more weatherproofing tubes encircle the one or more electrical lines which have individual electrical insulations.

10. The apparatus for the outdoor network equipment enclosure of claim 8, wherein the one or more weatherproofing tubes are made of malleable plastics, fabrics, or any material that provide some degree of impermeability against external elements.

11. The apparatus for the outdoor network equipment enclosure of claim 8, wherein the one or more weatherproofing tubes are made of polyvinyl chloride (PVC)-based material.

12. The apparatus for the outdoor network equipment enclosure of claim 8, further comprising a plurality of screws to enable the lid form the weatherproof, watertight, and/or splash-proof condition for the front portion of the outdoor network equipment enclosure.

13. The apparatus for the outdoor network equipment enclosure of claim 8, wherein the one or more clusters of electrical connectors provide electrical connections for power and/or data lines coming into the outdoor network equipment enclosure.

\* \* \* \* \*